March 6, 1962 F. B. BURNS 3,023,694
METHOD AND APPARATUS FOR RECOVERING A CONGEALED
SATURANT FROM SCRAP MATERIALS
Filed March 21, 1958
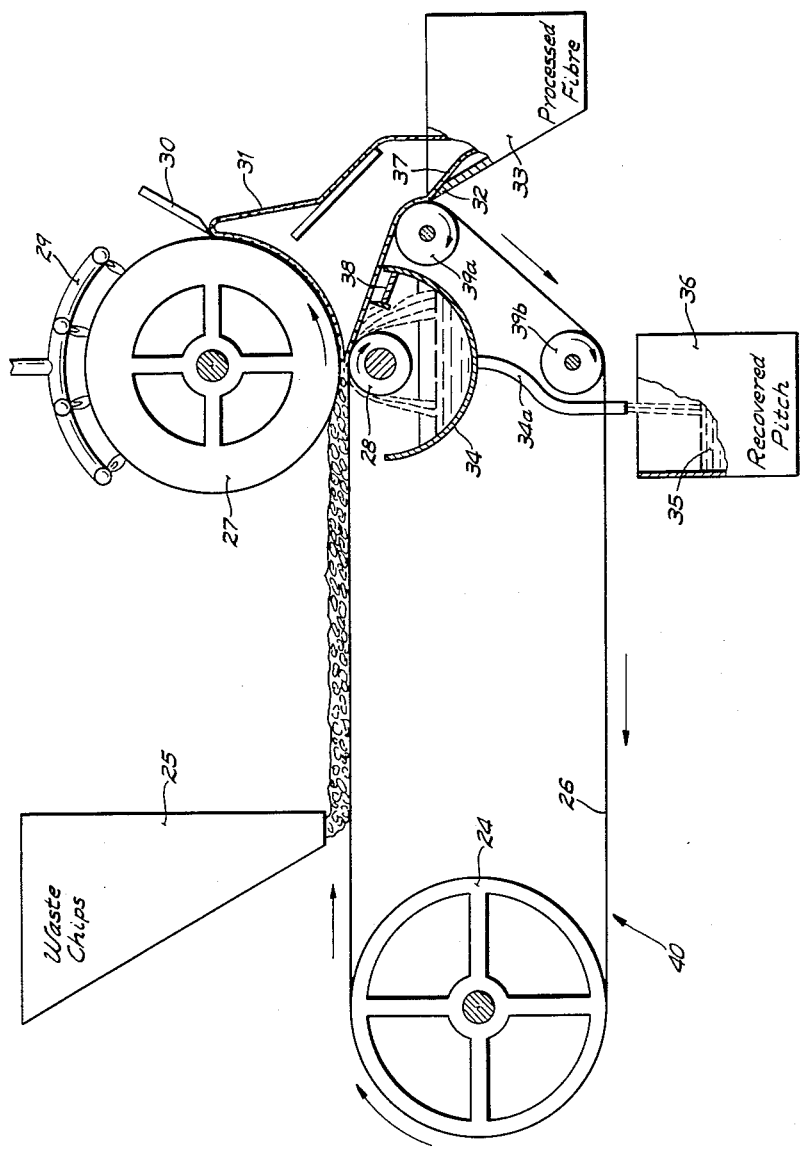
INVENTOR.
Fredrick B. Burns
BY
Attorney United States Patent Office 3,023,694
Patented Mar. 6, 1962

3,023,694
METHOD AND APPARATUS FOR RECOVERING A CONGEALED SATURANT FROM SCRAP MATERIALS
Fredrick B. Burns, West Allis, Wis., assignor to McGraw-Edison Company, Milwaukee, Wis., a corporation of Delaware
Filed Mar. 21, 1958, Ser. No. 723,009
2 Claims. (Cl. 100—93)

This invention relates in general to apparatus for recovering a congealed saturant from impregnated porous matter in scrap form and more particularly relates to apparatus for recovering pitch from scrap pitch impregnated fibrous material.

This invention relates to apparatus for recovering the saturant from saturated fibrous or other porous conduit employed to conduct and protect underground cables, telephone lines, electric lights, and other conductors and for the formation of water pipes, drain pipes, irrigation pipes, etc., which is impregnated by a suitable saturant to render the latter substantially waterproof and resistant to abrasion and corrosion in conditions encountered above or underground by the fibrous conduit, pipe, etc. While as above stated, the invention is particularly directed to the recovery of the saturant of fibrous conduit, it is to be understood that it may be employed to recover the saturant from any small fibrous or other articles which are similarly impregnated.

The basic fibrous matter which is impregnated with the saturant may be, of course, prepared in any known manner. In most cases, the fibrous bases for tubes is prepared from newsprint or paper pulp or other fibrous material which may be beaten in the usual paper beaters and the resulting stocks screened and then pumped to paper machines and there formed into a wet sheet. The paper tubes may be formed by winding the wet sheet upon a cylindrical or other shaped tube or mandrel to produce a wet conduit or tube of proper thickness. This conduit may then be dried in kilns to remove the major portion of the moisture content preparatory to impregnation. The fibre base may also be prepared in any other known manner. The tubes or articles are then impregnated in any known manner utilizing a suitable saturant which is normally congealed at the temperatures encountered in field use of the saturated articles.

Porosity or absorptive characteristics of the walls of the fibrous conduits or articles may vary within wide limits from the very dense wall of a density corresponding to hardwood and exceedingly difficult to saturate to a substantially porous open wall similar in density to that of roofing felt which will readily absorb bituminum saturants. Various types of saturants may be used, for example, coal tar pitch, gas tar pitch, asphalt, cut back pitch or other water proofing material may be used as suitable and desired. However, in many applications, it is preferred that coal tar pitch be used because of its particular characteristics, and this coal tar pitch is quite expensive.

As a certain percentage of the tubes are found to be defective after manufacture and thus have to be discarded, a certain amount of scrap is encountered. Further, in order to make a connection between adjoining elongated tubes to form a continuous pipe or conduit, the ends of the various tubes are machined to receive the tapered end portion of the next adjacent tube. These machining operations, of course, occasion much finely divided scrap. Heretofore, not only has this scrap represented a non-recovered cost but for many years the disposal of this scrap material has posed problems in storage and cartage. Burning of the scrap, on the other hand, provides noxious fumes which have severely impeded the unrestricted burning thereof. (It might be noted that these noxious fumes from burning of the impregnated scrap materials cause humans, after prolonged exposure, to be adversely affected, i.e., the so-called "pitch burn.")

The novel apparatus of the instant application obviates the problems presently occasioned by scrap by both recovering the pitch or other saturant from the fibrous material and permitting the reuse of both the pitch and the fibrous material.

This particular aspect of reusing the pitch is particularly significant. Some saturants such as pitch are of a highly complex chemical nature. The preservative properties of these saturants are inherently dependent on the complicated chemical structures of these materials. It is an object of this invention to allow recovery of the saturants by purely physical means to avoid upsetting the unique chemical balances of the saturants, thus recovering the saturant in a form equally useful as in its original state.

Some saturants, in particular pitch, possess an unusual physical property inasmuch as they do not have a specific liquifying point with regard to temperature. It is possible by certain physical means, for example the application of heat, to reduce both the viscosity and surface tension factors which control the degree of congealment of the saturants.

This liquifying means alone is not sufficient to release the saturant from the fibrous or porous structure of the impregnated matter because there exists in addition a physical attraction of the saturant for the fibrous or porous matter.

It has been found that by the application of pressure to the matter, in addition to the means for reducing the viscosity and surface tension factor of the saturant, removal of the saturant can be accomplished.

It is thus an object of this invention to provide a novel apparatus for recovering congealed saturant from impregnated porous matter in scrap form by heating the collected scrap to reduce the viscosity and surface tension of the saturant and physically pressing the saturant therefrom.

It is a further object of this invention to provide apparatus of the above general type which is continuous in operation and includes metering the flow of scrap onto an endless belt, heating the scrap and pressing the liquified saturant from the scrap and then collecting the liquified saturant and the separated fibrous material.

It is a further object of the invention to provide apparatus of the type aforementioned which is simple in operation, is easy to install and maintain and is otherwise well adapted for purposes for which it was designed.

The novel features that are characteristic of the invention are set forth with particularity in the appended claims. The invention itself both as to its organization and its method of operation together with additional objects and advantages thereof will best be understood by the following description when read in connection with the accompanying drawing, which is a semidiagrammatic view of the automatic apparatus for recovering saturant from scrap materials.

Turning now to the drawing, a hopper means 25 is located above a traveling belt 26 and is adapted to contain and meter a flow of scrap thereunto. The belt 26 is also a holder and is preferredly made of a fine mesh screen having a plurality of interstices pervious to the liquid saturant and impervious to the fibrous matter. The belt 26 also moves the metered flow of scrap toward suitable pressure rolls 27 and 28 located on the upper and lower sides respectively of belt 26. Suitable idler rolls 39a and 39b and return roll 24 are provided to provide the constant movement of the belt as shown. It is noted that any one of the rollers may be the driving member of the apparatus, the apparatus under discussion being driven by roller 24 which is suitably connected to a source of power not shown.

Heating means 29 is shown associated with the larger upper pressure roller 27 to heat same, the heat in turn being transmitted to the scrap on the belt. By using such an oversized roller for heating the scrap, a greater effective heating area is provided. Furthermore, since this larger roller has a greater mass it is more easily maintained at the desired heating temperature. Heat may also be supplied to the scrap in the hopper means 25 to preheat the chips and scrap so that the saturant (coal tar pitch) is in liquid form although still associated with the fibrous matter. The wringer means formed by pressure rolls 27 and 28 squeeze or compress the scrap such that the liquified saturant then is forced through the interstices in endless belt 26 to be collected in the collector means 34 disposed therebelow. At the bottom of the collector means 34 is a suitable outlet 34a which leads to container 36 which receives the recovered pitch 35. As shown, deflector means 38 is disposed on down stream side of the movement of the chip to deflect and scrape upon the under side of the belt 26 to insure collection of the pitch that normally would adhere to the under side of the belt.

Scraping means 30 is associated with the upper pressure roll 27 to scrape the fibrous material that tends to adhere to the surface of the roll 27. Suitable deflector means is provided so as to lead the scraped off fibre matter 31 into container 33. Suitable deflector means 32 is provided to impinge upon the belt 26 near idler roll 39a so as to scrape the belt 26 clean. This recovered scrap 37 also leads to container 33.

In the actual process of separation of the saturant from the fibrous matter, certain limitations in terms of temperature must be kept in mind. When, for example, the porous matter is cellulose matter, it has been found that heat should be supplied to the scrap until it reaches a temperature just below the carbonization point thereof. In actual test, it has been ascertained that a temperature of 550° F. carbonizes the cellulose matter to the point that it deleteriously affects the operation of the separating process. On the other hand, a temperature of 500° F. and pressure of 3,200 p.s.i. produces a high yield of separation. Further, it has been found that the yield increases with amount of pressure supplied but this factor is dictated by commercial considerations. For example, 5,100 p.s.i. pressure at 400° F. produces the same yield as 3,200 p.s.i. pressure at 500° F.

When other fibrous matter such as asbestos or the like form the base material, then the limiting temperature to which the scrap material may be heated is defined by the temperature at which the volatile portions of the pitch will be driven off. This varies as per types and kinds of saturants but is readily ascertainable in the lab.

Although a single embodiment of the invention has been shown and described, it is with full awareness that many modifications thereof are possible. The invention, therefore, is not to be restricted except insofar as necessitated by the prior art and by the spirit of the appended claims.

What is claimed as the invention is:

1. Apparatus for the continuous recovering of congealed coal tar pitch saturant from pitch impregnated, cellulose-fibre scrap materials comprising hopper means for containing and metering a flow of scrap therethrough, a continuous belt type holder means disposed adjacent said hopper means to receive the scrap therefrom and having interstices pervious to said coal tar pitch when in liquid form and impervious to the fibrous matter portion of the scrap, heating means to impart heat to said scrap material and operable to raise the temperature of said scrap to a point below 550° F. to liquify the pitch saturant without carbonization of the cellulose matter, pressure means in the form of a pair of pressure rolls disposed at opposite sides of said continuous belt type holder means and being operatively associated with said holder means and scrap to effect compressive pressure on the latter and thereby cause movement of the liquified pitch through said interstices of said holder means while retaining said fibrous matter, said heating means being the pressure roll disposed on the scrap receiving side of said continuous belt type holder means, the heat applying pressure roll being of a substantially greater diameter than the opposed pressure roll, first scraper means adjacent the fibrous matter retaining side of said holder means to scrape the fibrous matter from said holder means, second scraper means adjacent the pressure roll on the fibrous matter retaining side of said holder means to scrape the fibrous matter from said pressure roll, and collection means adjacent said pressure means and said holder means for collection of the separated saturant and fibrous matter, whereby substantially unaltered pitch is separated from said fibrous matter.

2. Apparatus as described in claim 1 and having additional scraper means adjacent the side of said holder means opposite the fibrous matter retaining side to scrape the liquid pitch therefrom.

References Cited in the file of this patent
UNITED STATES PATENTS

| | | |
|---|---|---|
| 18,367 | Wilber | Oct. 6, 1857 |
| 148,870 | Booth | Mar. 24, 1874 |
| 514,780 | Seiler et al. | Feb. 13, 1894 |
| 595,022 | Lelardoux | Dec. 7, 1897 |
| 696,883 | Atwood | Apr. 1, 1902 |
| 831,041 | Davis et al. | Sept. 18, 1906 |
| 1,238,289 | Hare | Aug. 28, 1917 |
| 1,265,655 | Henderson | May 7, 1918 |
| 1,535,769 | Gallardo | Apr. 28, 1925 |
| 1,659,401 | Kirschbraun | Feb. 14, 1928 |

FOREIGN PATENTS

| | | |
|---|---|---|
| 5,274 | Great Britain | Feb. 27, 1897 |